United States Patent
Woods et al.

(10) Patent No.: US 9,644,659 B2
(45) Date of Patent: May 9, 2017

(54) TEMPORARY CLAMP UP SYSTEM FOR SEALANT SQUEEZE OUT IN LOCK BOLT INSTALLATIONS

(71) Applicant: The Boeing Company, Chicago, IL (US)

(72) Inventors: Mark A. Woods, Renton, WA (US); John A. Davies, Renton, WA (US); Gregory J. Shish, Bothell, WA (US); Kwok Tung Chan, Issaquah, WA (US); Eric M. Avakian, Seattle, WA (US); Dan Day, Seattle, WA (US); Omar J. Pacheo Agosto, Renton, WA (US)

(73) Assignee: The Boeing Company, Chicago, IL (US)

( * ) Notice: Subject to any disclaimer, the term of this patent is extended or adjusted under 35 U.S.C. 154(b) by 365 days.

(21) Appl. No.: 14/215,572

(22) Filed: Mar. 17, 2014

(65) Prior Publication Data
US 2015/0260217 A1  Sep. 17, 2015

(51) Int. Cl.
F16B 1/00 (2006.01)
F16B 19/05 (2006.01)
F16B 19/00 (2006.01)
F16B 19/10 (2006.01)

(52) U.S. Cl.
CPC ............ *F16B 19/05* (2013.01); *F16B 19/008* (2013.01); *F16B 19/109* (2013.01); *Y10T 29/49908* (2015.01); *Y10T 29/49966* (2015.01)

(58) Field of Classification Search
CPC ....... F16B 19/05; F16B 19/008; F16B 19/109
USPC ..................... 29/243.521, 243.519
See application file for complete search history.

(56) References Cited

U.S. PATENT DOCUMENTS

| | | | | |
|---|---|---|---|---|
| 3,421,562 A * | 1/1969 | Orloff | ..................... | F16B 19/05 29/517 |
| 3,464,472 A * | 9/1969 | Reynolds | ............... | F16B 19/008 411/336 |
| 3,655,227 A * | 4/1972 | Orloff | ..................... | F16B 19/05 29/446 |
| 4,069,575 A * | 1/1978 | Sigmund | ................. | B23P 11/02 29/446 |
| 4,408,936 A * | 10/1983 | Williamson | ............ | F16B 19/05 411/281 |
| 4,867,625 A * | 9/1989 | Dixon | ..................... | F16B 19/05 29/437 |
| 4,979,279 A * | 12/1990 | Garvey | .................. | B21J 15/022 29/252 |
| 5,061,132 A * | 10/1991 | Cosenza | ............... | F16B 39/026 411/278 |

(Continued)

OTHER PUBLICATIONS

"How Huck LockBolts and Structural Blind Fasteners Works"; Alcoa Fastening Systems, 2013 available at http://www.afshuck.net/en/Overview/How_Huck_Works.html.

(Continued)

*Primary Examiner* — Gary Estremsky
(74) *Attorney, Agent, or Firm* — Felix L. Fischer

(57) ABSTRACT

A joint fastening system employs a lock bolt having a pull stem and locking threads inserted through a bore in a joint having fay sealant between layers. A collar is received over the pull stem to engage the threads, the collar producing tension on the threads to generate clamp force sufficient for fay sealant squeeze out.

25 Claims, 17 Drawing Sheets

(56) References Cited

U.S. PATENT DOCUMENTS 5,125,778 A * 6/1992 Sadri .................. B21J 15/022
                                                411/361
5,865,581 A * 2/1999 Sadri .................. F16B 31/021
                                                411/270

OTHER PUBLICATIONS

"hi-Lok, hi-Tigue Fastening Systems Installation Instructions", Hi-Shear Corporation, 1991.

* cited by examiner

TEMPORARY CLAMP UP SYSTEM FOR SEALANT SQUEEZE OUT IN LOCK BOLT INSTALLATIONS

BACKGROUND INFORMATION

Field

Embodiments of the disclosure relate generally to the field of lock bolts for composite and metal structures and more particularly to temporary clamp systems for tightening of lock bolts to induce sealant squeeze-out prior to collar fixation on the lock bolt for lock bolts employed with fay-seal applications.

Background

Composite and metal structures having joints with fay surface sealant are often assembled with lock bolts, sleeved lock bolts or sleeved threaded lock bolts. For such applications, it is often necessary to apply a temporary clamp load for an extended period of time, twenty minutes in exemplary applications, to allow the sealant to flow away from the fastener before the final nut tightening or swaging can be completed. Current solutions employ a temporary threaded pin fastener received in the fastener hole in the composite with a head on a first surface of the composite structure and engaged with a temporary threaded nut tightened against a second opposite surface of the composite structure. The entire temporary fastening system, pin and nut, are removed after sealant squeeze out has been accomplished and replaced with a permanent lock bolt and associated swaged collar. This may adversely impact assembly time and handicap automated assembly solutions.

It is therefore desirable to provide a sealant squeeze-out system providing tension on a standard lock bolt.

SUMMARY

Embodiments disclosed herein provide a joint fastening system employing a lock bolt having a pull stem and threads or swage rings inserted through a bore in a joint having fay sealant between layers. A collar is received over the pull stem to engage the threads. The collar is torqued to produce tension on the lock bolt to generate a clamp force sufficient for fay sealant squeeze out.

The embodiments provide a method of installing a fastener system where a lock bolt having a pull stem and threads or annular rings is inserted through a bore in a joint having fay sealant between layers. The collar is received over the pull stem to engage the threads or annular rings or a split sleeve is used to engage the pull stem and tension is produced on the lock bolt to generate clamp force sufficient for fay sealant squeeze out.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a method of engaging a lock bolt inserted through a hole in a composite or metal joint, having fay sealant between layers, to allow tensioning of the lock bolt to generate clamp force sufficient for fay sealant squeeze out. In certain embodiments, the tensioning device is then removed and a collar is received over the lock bolt to be swaged for completing a fastener system. In alternative embodiments for threaded lock bolts or sleeved threaded lock bolts, a collar incorporates a frangible drive element which separates at a predetermined torque establishing a preload on the lock bolt to generate the desired clamp force for sealant squeeze out. The frangible drive element is removed and the collar is swaged using a standard swaging tool engaging the pull stem which fractures at a neck for removal.

Figure 1:
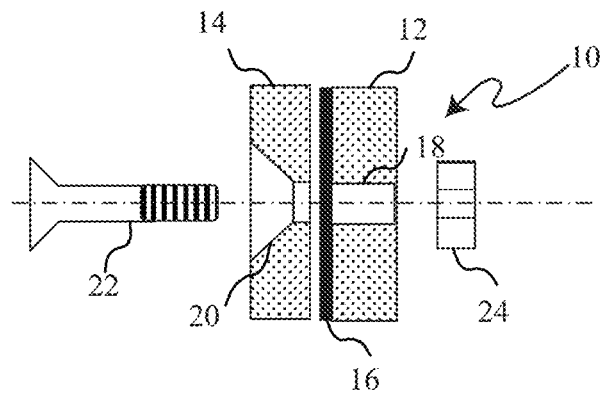
FIG. 1 is a section view of a prior art temporary threaded pin and nut system for fay sealant squeeze out in a joint assembly.
Figure 2:
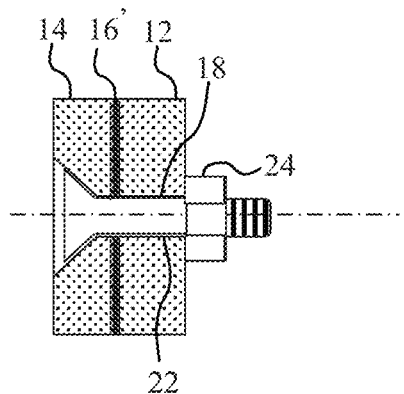
FIG. 2 is a section view of the prior art system of FIG. 1 with the threaded pin and nut assembled for fay sealant squeeze out.
Figure 3:
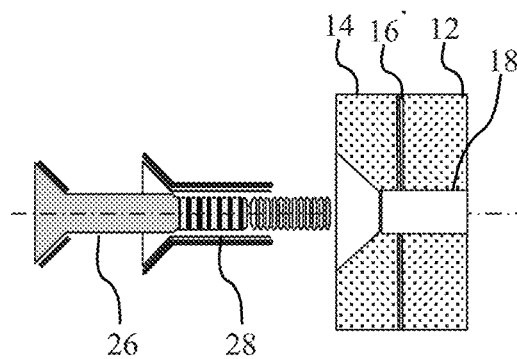
FIG. 3 is a side section view of the prior art system with the temporary threaded pin and nut removed for installation of a sleeved lock bolt and sleeve.

Referring to the drawings, composite and composite/metal joints often incorporate a sealant between layers as shown in FIG. 1. Joint 10 has a first layer 12 and second layer 14, for the embodiment shown and a fay sealant 16 is introduced between the first and second layer. A bore 18 through the joint 10 having a countersink 20, for the embodiment shown, is provided to receive a fastening system, typically a lock bolt and swage collar, to secure the layers of the joint. In prior art assembly operations, prior to insertion of the fastening system, squeeze out of the fay sealant is accomplished using a temporary threaded pin 22 received through the bore with a temporary nut 24. The temporary threaded pin 22 and temporary nut 24 are torqued to establish a clamp force sufficient to provide squeeze out of the fay sealant (shown as element 16' in the reduced thickness after squeeze out) as shown in FIG. 2. The temporary threaded pin 22 and temporary nut 24 are then removed and a permanent fastener such as a lock bolt 26 is then inserted into the bore 18 as shown in FIG. 3. In certain embodiments, a sleeve 28 is inserted into the bore to create an interference fit between the bore and fastener.

Figure 4:
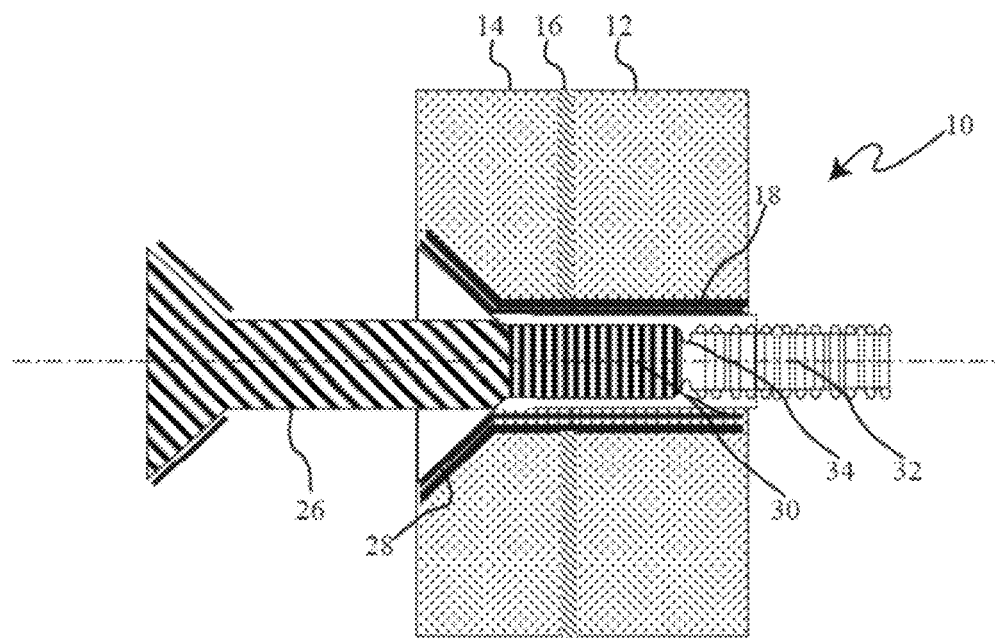
FIG. 4 is a side section view of a fastener installation employing the present embodiments with a sleeved lock bolt for insertion prior to fay sealant squeeze out to remain in place for permanent installation.
Figure 5:
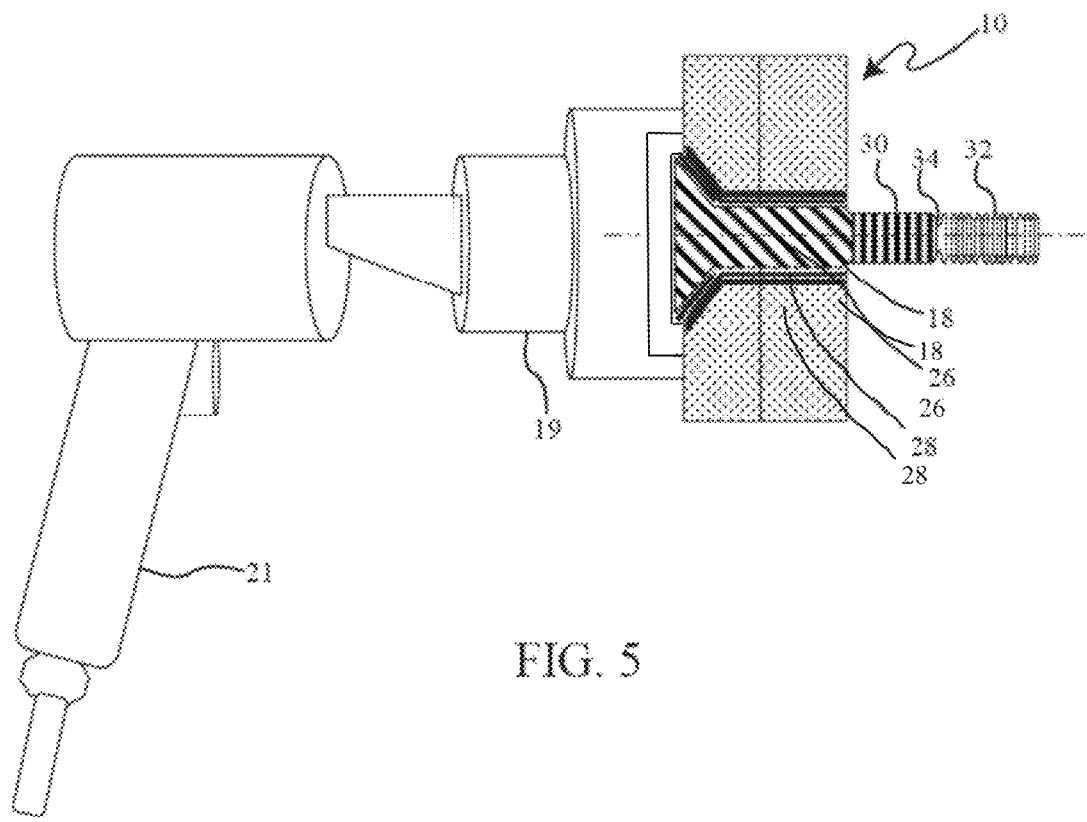
FIG. 5 is a side section view of an installation example with a rivet gun with a spacing sleeve for insertion of an interference fit lock bolt and sleeve.

The present embodiments eliminate the requirement for the temporary pin and nut and the associated operational steps of insertion and removal. As shown in FIG. 4, joint 10 with fay sealant 16 applied between first layer 12 and second layer 14 receives the final fastener, lock bolt 26 into a sleeve 28 inserted in bore 18. Lock bolt 26 incorporates threads 30 and a pull stem 32 with a neck 34 for frangible removal of the pull stem during swaging of a locking collar as is standard for fastener systems of this type. Exemplary lock bolts may be BACB31N bolts by Alcoa Fastening Systems. As represented in FIG. 5 for interference fit embodiments employing the sleeve 28, the lock bolt 26 may be driven into the bore 18 in the joint 10 to approximately 90 to 95% of full insertion depth. The sleeve 28 which is sized for an interference fit with the lock bolt 26 expands as the lock bolt is driven into place providing an expanding interference fit between the lock bolt 26, sleeve 28 and bore 18. A spacing sleeve 19 on rivet gun 21 may be employed to assure that no impact on the laminate surface occurs.

Figure 6:
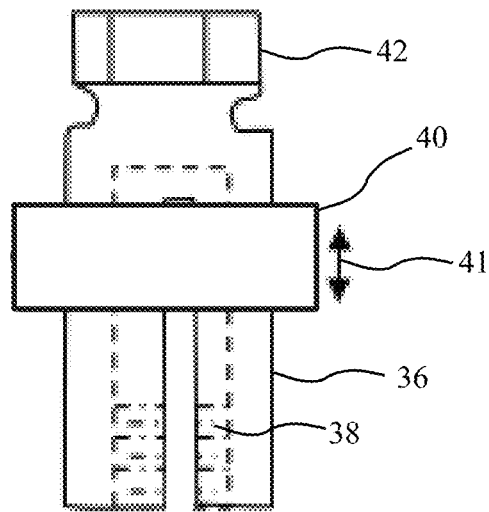
FIG. 6 is a side hidden view of a first embodiment of a tensioning split collar and securing ring.
Figure 7:
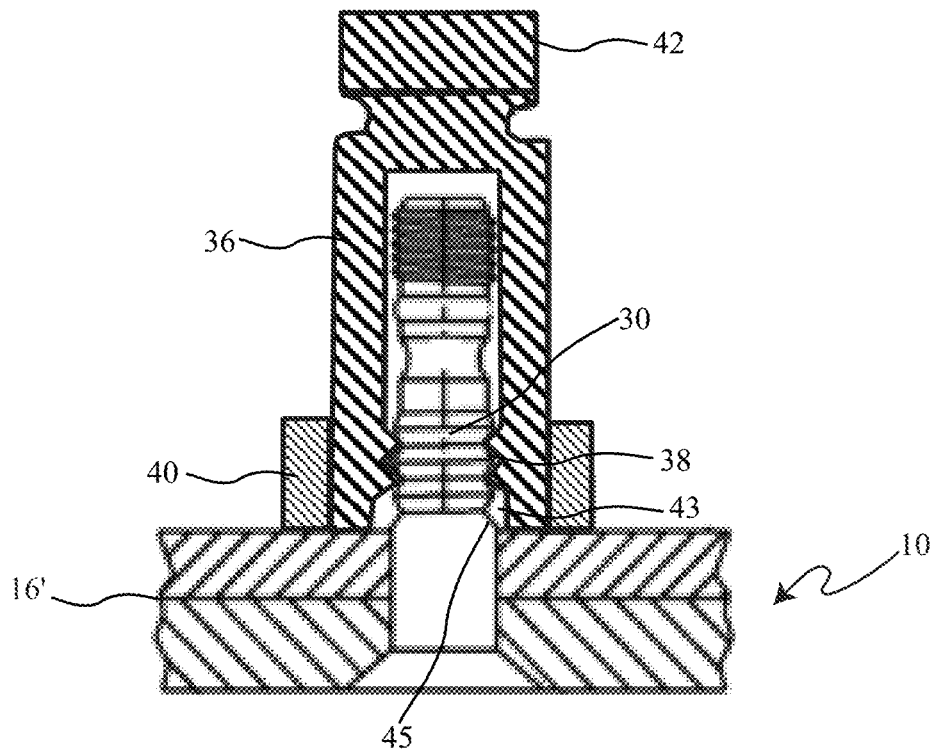
FIG. 7 is a side section view of the first embodiment as installed on the inserted lock bolt.

FIGS. 6 and 7 show a first embodiment employing a resiliently expanding collet clamp 36 having threads 38 adapted as a collar for engaging the locking threads 30 on the lock bolt 26. A retention ring 40 is concentrically received over the collet clamp 36 to radially compress the collet clamp. With the collet clamp 36 uncompressed, the threads 38 of the collet clamp 36 are received over the pull stem 32 of the lock bolt 26 and axial translation of the retention ring 40, as represented by arrow 41, compresses the collet clamp 36 to engage the locking threads 30 of the lock bolt 26 with the threads 38 of the split sleeve as shown in FIG. 7. A drive element 42, a hex drive for the embodiment shown, is provided for applying torque to the collet clamp 36 engaged on the locking threads 30 of the lock bolt 26 to tension the lock bolt 26 drawing the lock bolt substantially into 100% insertion depth and providing a clamping force sufficient to induce squeeze out of the fay sealant 16'. Sufficient clamping force is defined as that force required for reducing the fay sealant layer to a thickness defined by specification for the joint and will vary depending on joint configuration. A circumferential relief 43 is provided to receive a shoulder 45 on the lock bolt 26, if required. Clamp up with the collet clamp 36 may be maintained as required to complete the fay sealant squeeze out, typically 20 minutes in exemplary applications. The retention ring 40 is then withdrawn allowing the collet clamp 36 to resiliently expand for removal. A swage collar is then received over the pull stem 32 of the lock bolt 26 and swaged to secure the lock bolt 26 in a conventional manner.

Figure 8:
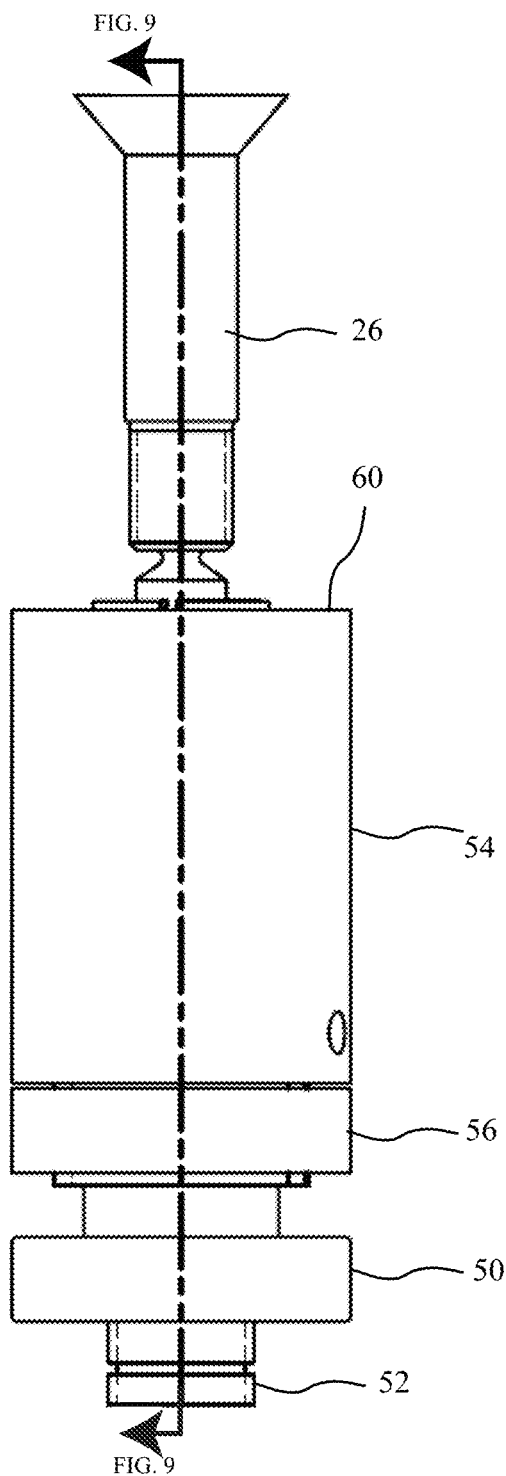
FIG. 8 is a side view of a second embodiment of a tensioning split collar with securing sleeves.
Figure 9:
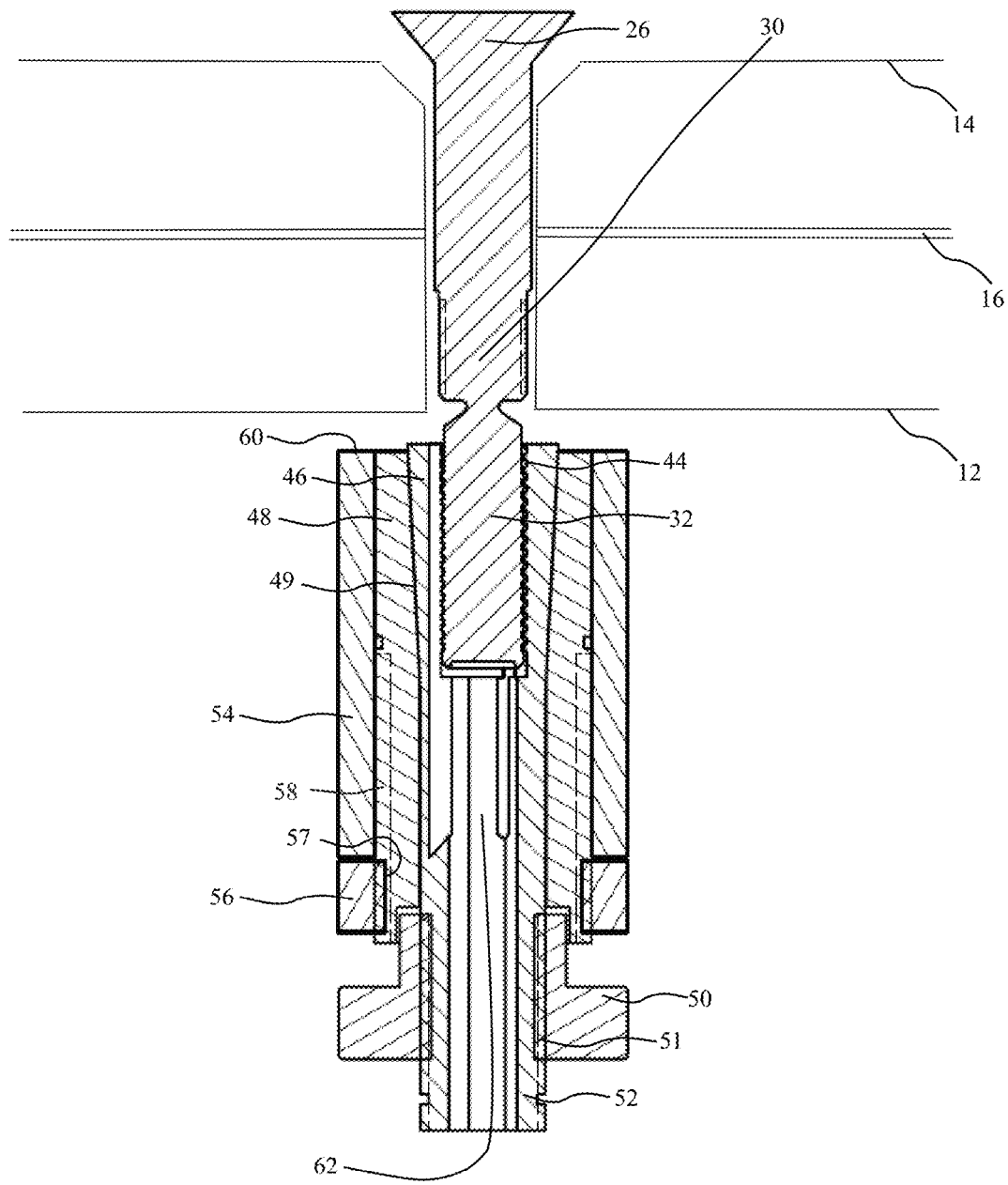
FIG. 9 is a section view of the second embodiment.

A second embodiment is shown in FIGS. 8 and 9. Engagement of the pull stem 32 on the lock bolt 26 is accomplished by a compressible inner split sleeve 44 having a tapered circumference 46 acting as the collar to engage the pull stem. In an uncompressed condition, inner split sleeve 44 is received over pull stem 32 of the lock bolt 26. An intermediate sleeve 48 incorporates a mating taper 49. Axial translation of the intermediate sleeve 48, induced by a first drive element 50 having threads 51 engaging a stem 52 extending from the inner split sleeve 44, compresses the split sleeve 44 for engagement of the pull stem 32 on the lock bolt 26. An outer sleeve 54 translates axially over the intermediate sleeve 48, responsive to a second drive element 56 having threads 57 engaging mating threads 58 on the intermediate sleeve, to engage face 60 with the surface of the first layer 12 of the workpiece to tension the lock bolt 26 for drawing the lock bolt substantially into 100% insertion depth and providing clamping force to induce squeeze out of the fay sealant 16. A stationary drive element 62 may extend from stem 52 to engage a mating anti-rotation feature in the lock bolt pull stem 32, described in greater detail subsequently. Since the inner split sleeve 44 does not rotate for threaded translation of the lock bolt 26 but merely applies a radial clamping force, engagement of the pull stem 32, as shown in the drawings, is possible. Clamp up with the compressible inner split sleeve may be maintained as required to complete the fay sealant squeeze out, typically 20 minutes in exemplary applications. The first drive element 50 is then withdrawn allowing the split sleeve 44 to resiliently expand for removal. A collar is then received over the lock bolt pull stem 32 and swaged to secure the lock bolt 26 in a conventional manner.

Figure 10:
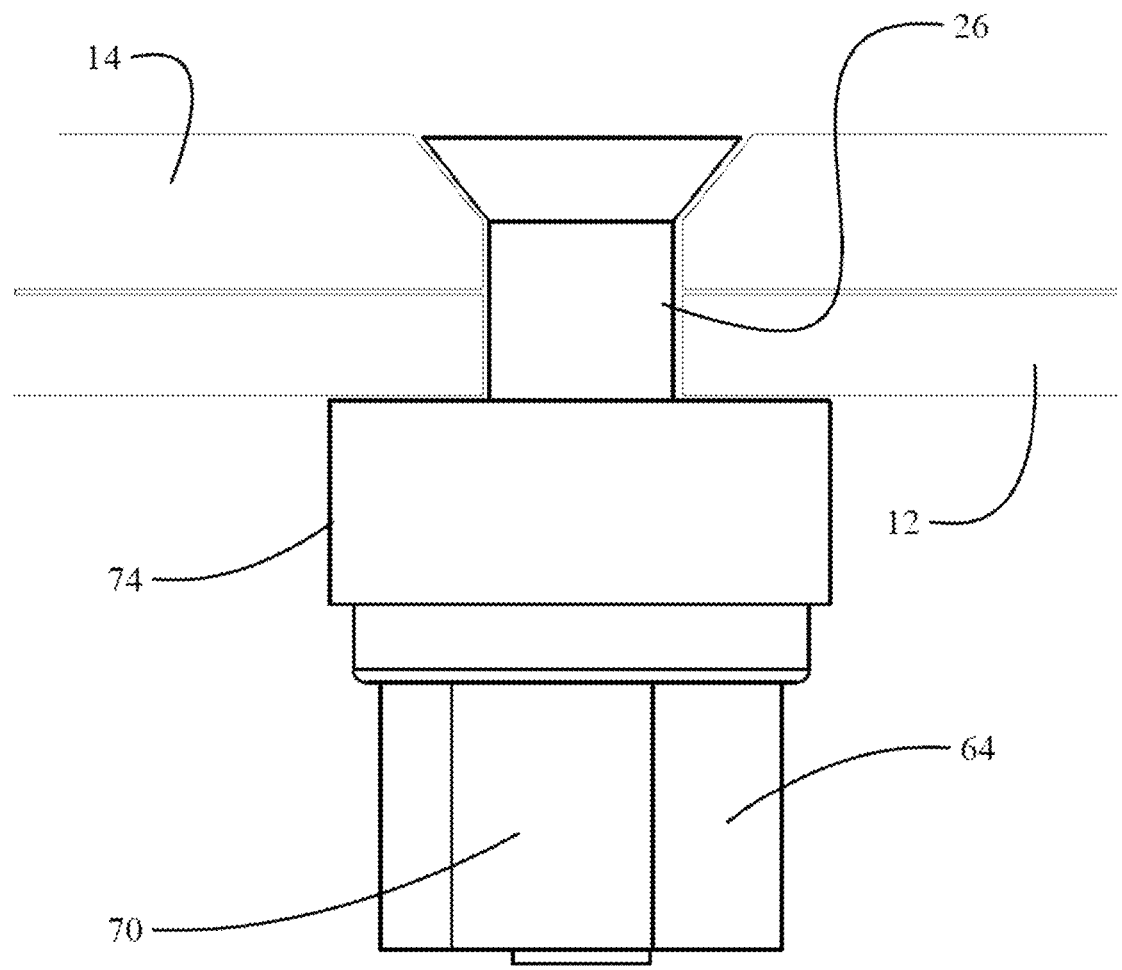
FIG. 10 is a side view of a third embodiment employing a reusable tensioning nut.
Figure 11:
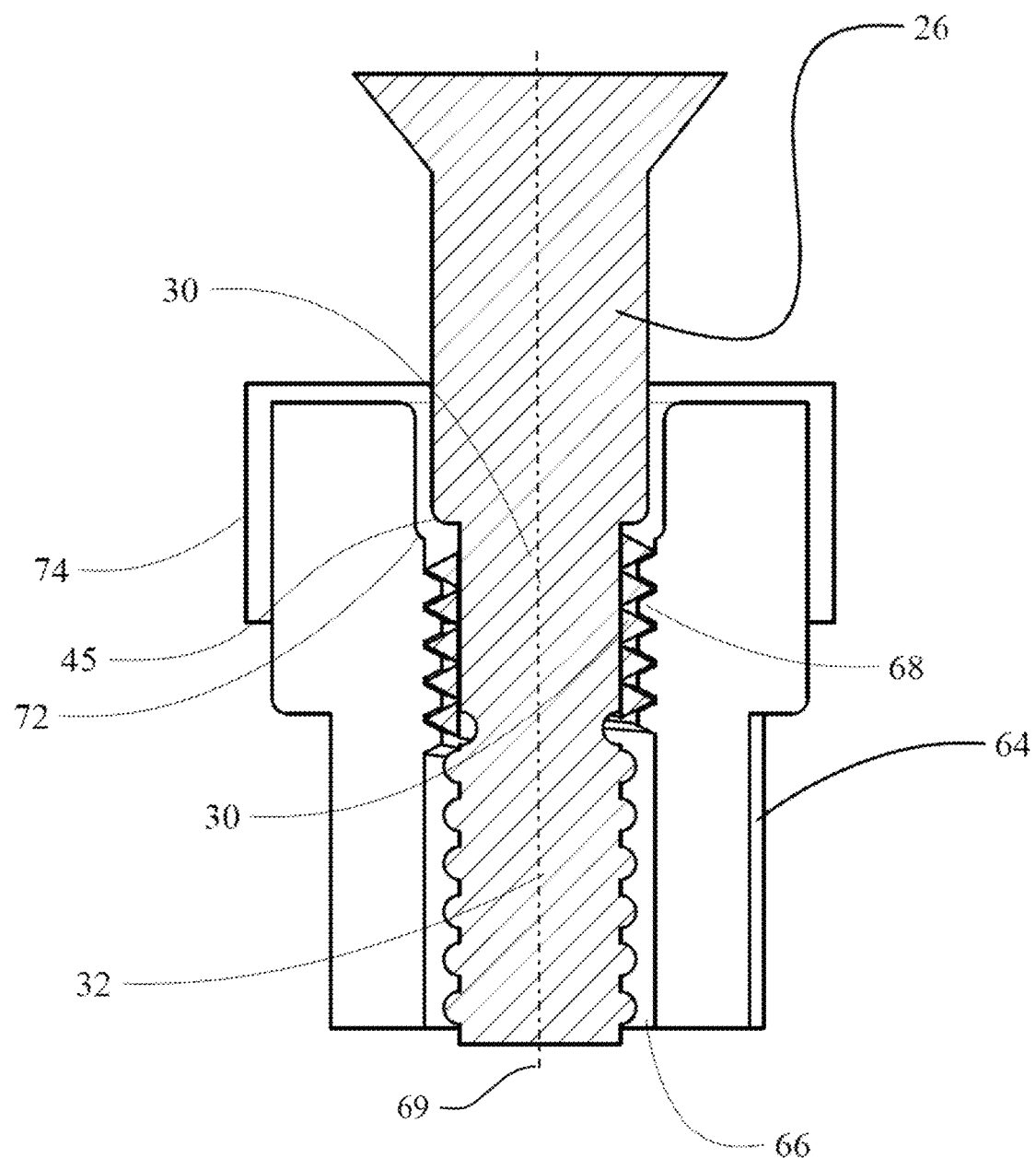
FIG. 11 is a side section view of the embodiment of FIG. 10.

A third embodiment is shown in FIGS. 10 and 11. A reusable collar 64 incorporates a bore 66 having threads 68 truncated radially at the root of the thread (the inner most radius or minor diameter of the thread with respect to a central axis 69) with a predetermined depth for the minor diameter to be received over the pull stem 32 of the lock bolt 26 but engage threads 30. In an exemplary embodiment, a ¼" lock bolt pull stem is employed with a diameter of about 0.24". The truncated thread 68 may have a normal minor diameter of 0.215" and may be reamed removing the ends of the thread root to a minor diameter that is larger than the predetermined depth of 0.24" to clear the pull stem.

Figure 12:
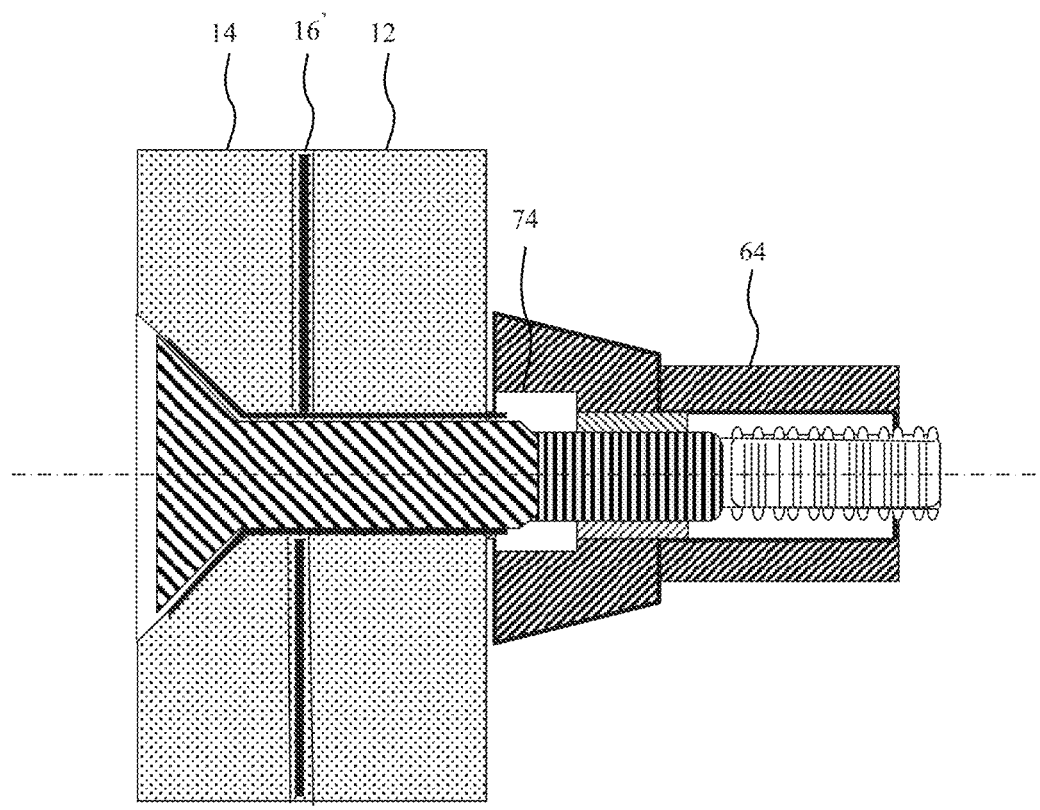
FIG. 12 is a side section view of the embodiment of FIG. 10 as installed on the lock bolt inserted in the laminate for fay sealant squeeze out.
Figure 13:
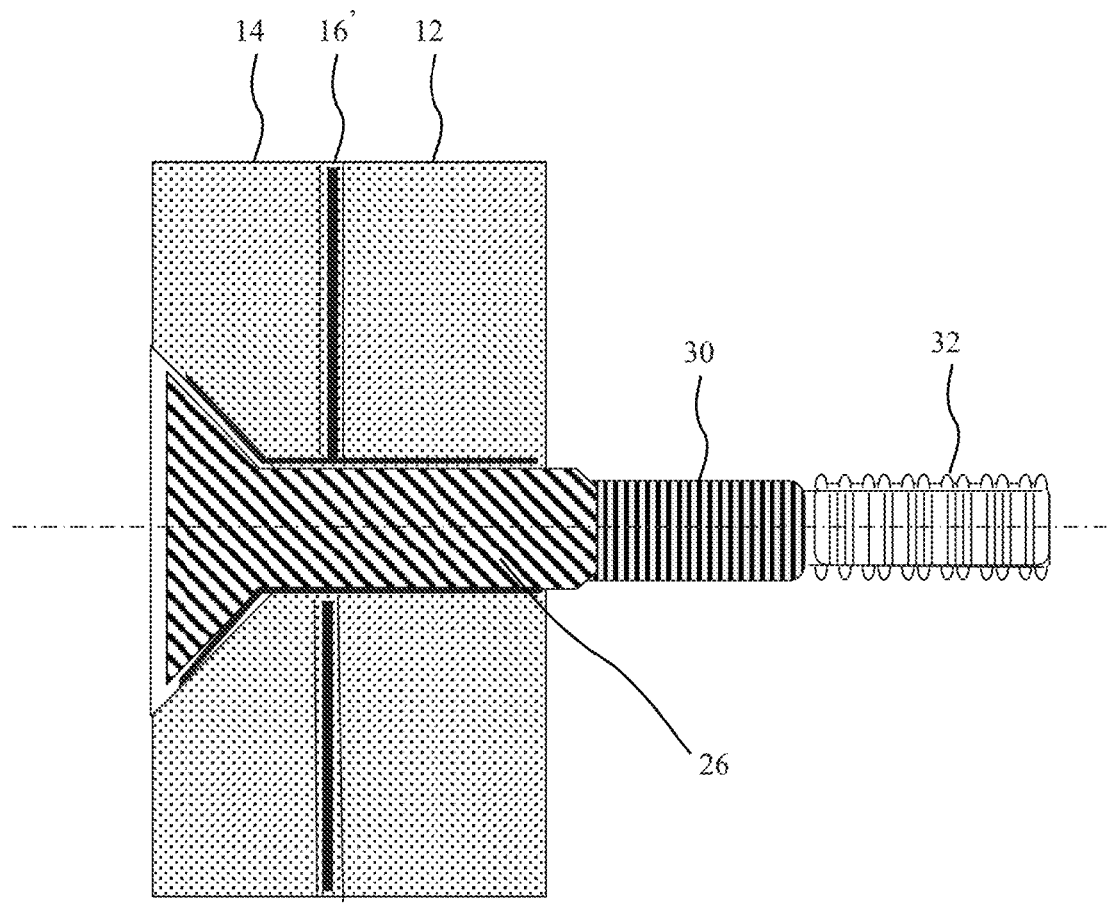
FIG. 13 is a side section view of the lock bolt after fay sealant squeeze out with the reusable tensioning nut removed from the lock bolt.

A drive element 70, a hex drive for the embodiment shown, is provided for applying torque to the collar 64 engaged on the threads 30 of the lock bolt 26 to tension the lock bolt, drawing the lock bolt substantially into 100% insertion depth and providing a clamping force sufficient to induce squeeze out of the fay sealant 16' as shown in FIG. 12. Returning to FIG. 11, a circumferential relief 72 is provided to receive a shoulder 45 on the lock bolt 26, if required. A lubricious cap 74 may be provided on the collar 64 for engagement of the first surface 12 of the work piece. Clamp up with the reusable collar 64 may be maintained as required to complete the fay sealant squeeze out, typically 20 minutes in exemplary applications. The reusable collar 64 is then untorqued and removed as shown in FIG. 13 placing the lock bolt in condition for a collar to be received over the pull stem of the lock bolt and swaged to secure the lock bolt in a conventional manner.

Figure 14:
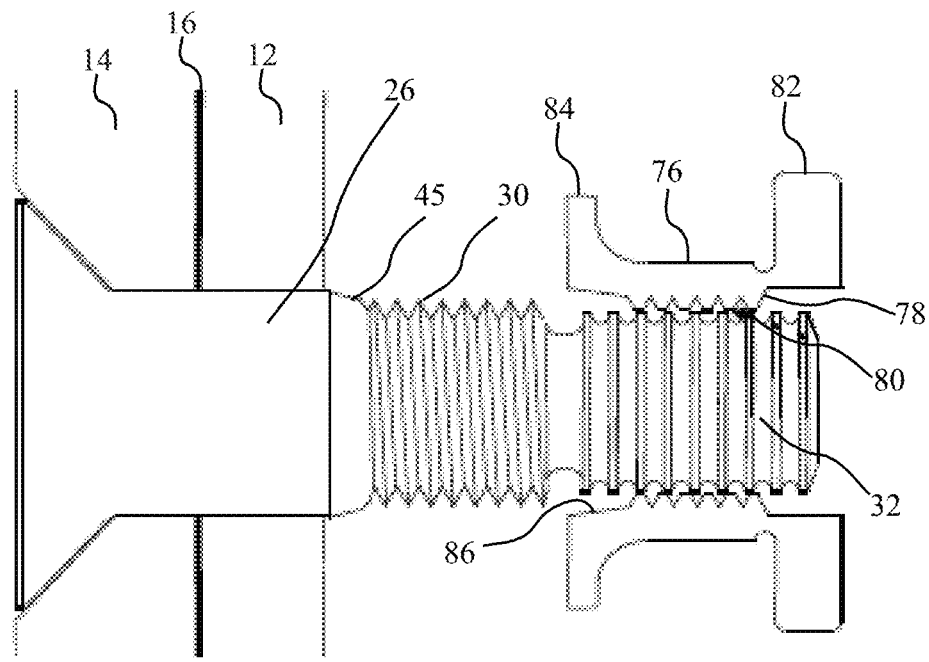
FIG. 14 is a partial section side view of a fourth embodiment employing a collar with a frangible drive element and having truncated threads to be received over the pull stem of the lock bolt.
Figure 15:
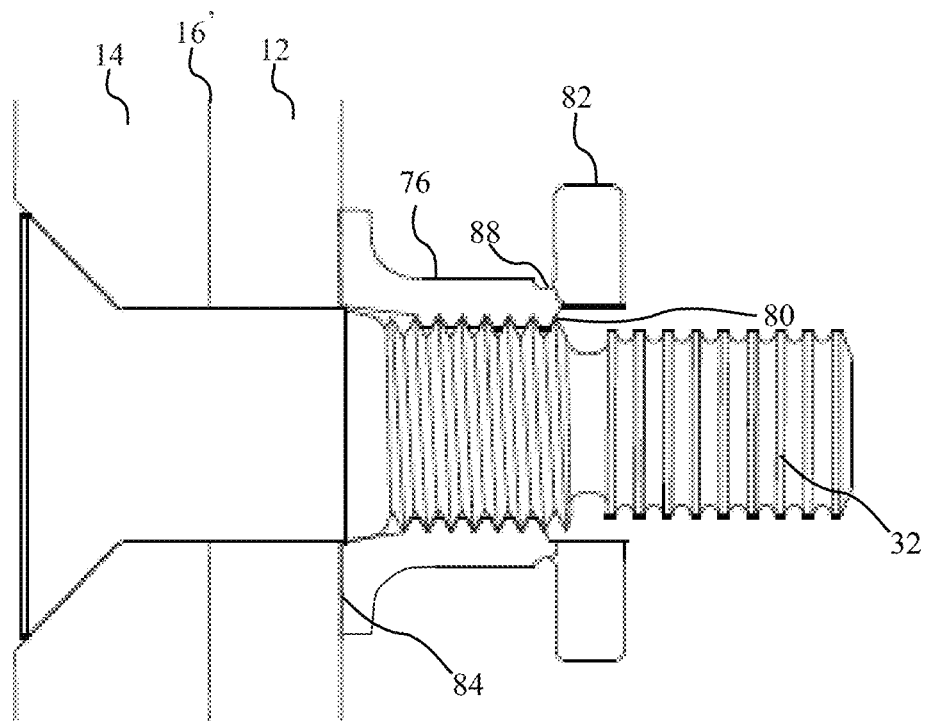
FIG. 15 is a partial section side view of the embodiment of FIG. 14 with the collar torqued for fay sealant squeeze out.

A fourth embodiment employs a collar 76 incorporating a bore 78 having truncated threads 80 as previously defined with a predetermined depth to be received over the pull stem 32 of the lock bolt 26 but engage threads 30 as shown in FIG. 14. As with the prior description of the third embodiment for an exemplary configuration, a ¼" lock bolt pull stem is employed with a diameter of about 0.24". The truncated threads 80 may have a normal minor diameter of 0.215" and may be reamed removing the ends of the thread root to a minor diameter that is larger than 0.24" to clear the pull stem. A drive element 82, a hex drive for the embodiment shown, is provided for applying torque to the collar 76 engaged on the threads 30 of the lock bolt 26 with a circumferential foot 84 engaging the first surface 12 of the work piece to tension the lock bolt drawing the lock bolt substantially into 100% insertion depth as shown in FIG. 15. A circumferential relief 86 is provided to receive a shoulder 45 on the lock bolt 26, if required.

Figure 16:
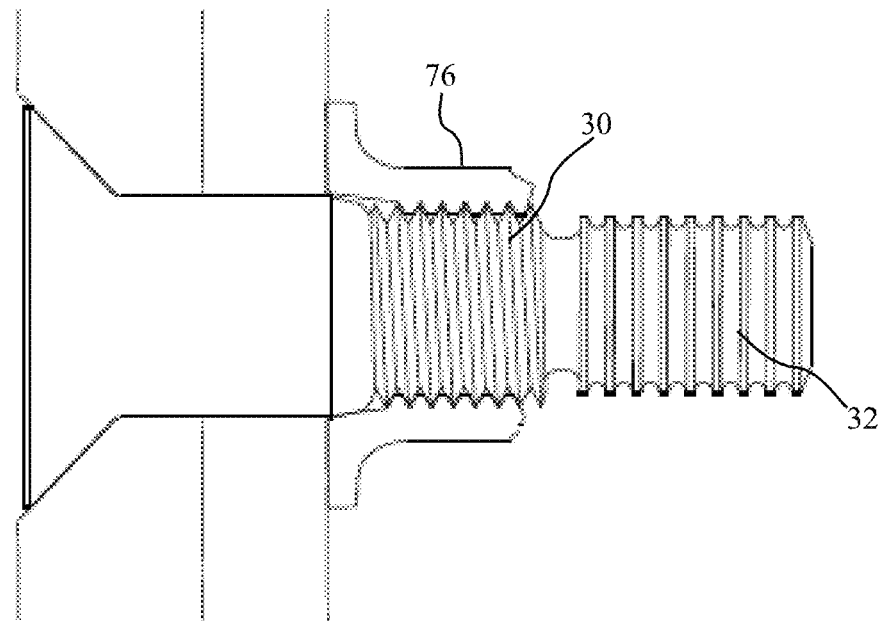
FIG. 16 is a partial section side view of the embodiment of FIG. 14 with the frangible drive element removed after fracture.
Figure 17:
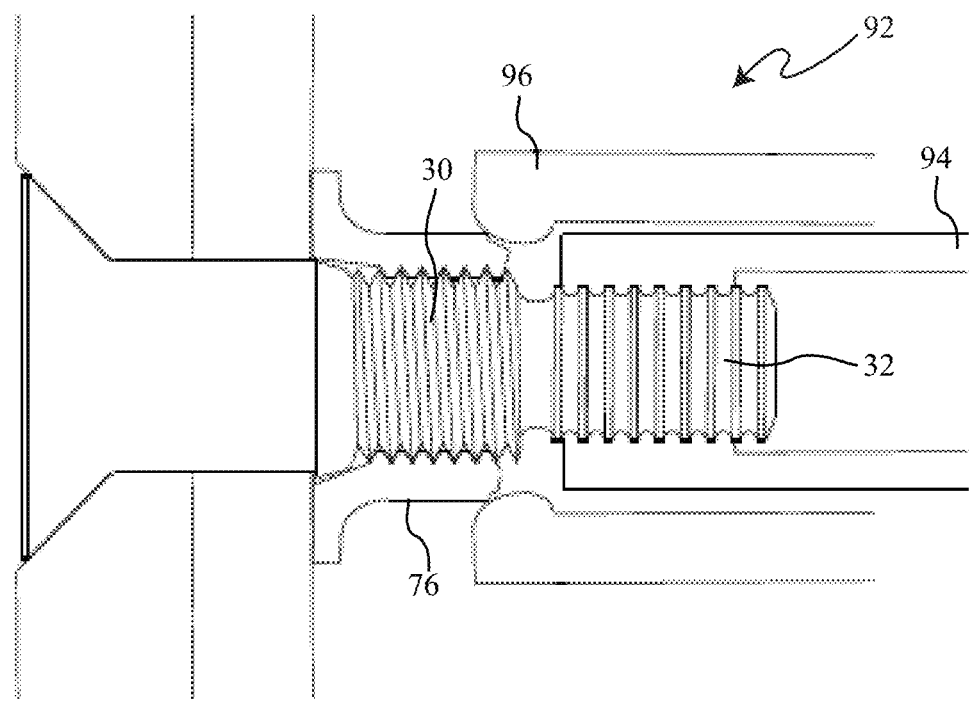
FIG. 17 is a partial section side view of the embodiment of FIG. 14 with a swaging tool attached for swaging of the collar.
Figure 18:
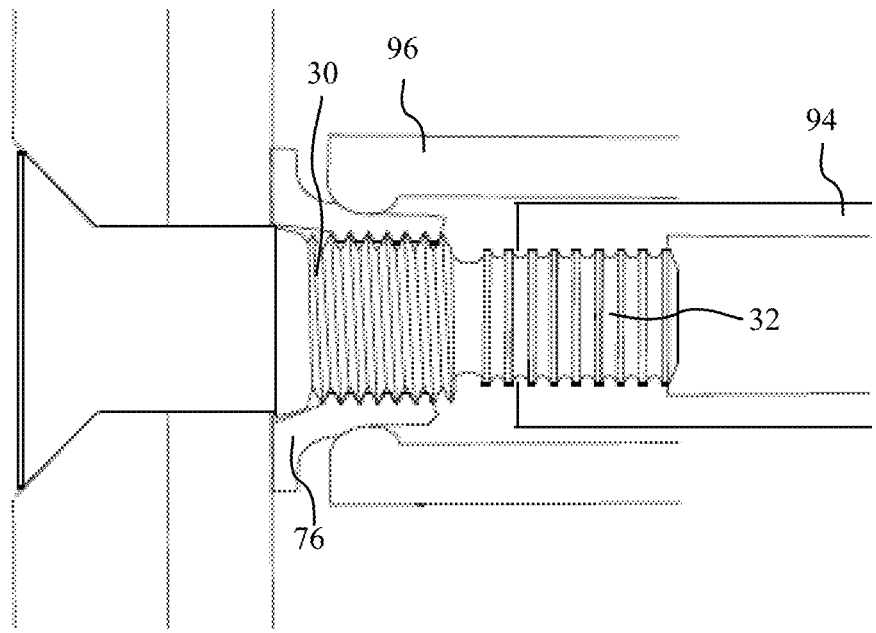
FIG. 18 is a partial section side view of the embodiment of FIG. 14 with the swage completed.
Figure 19:
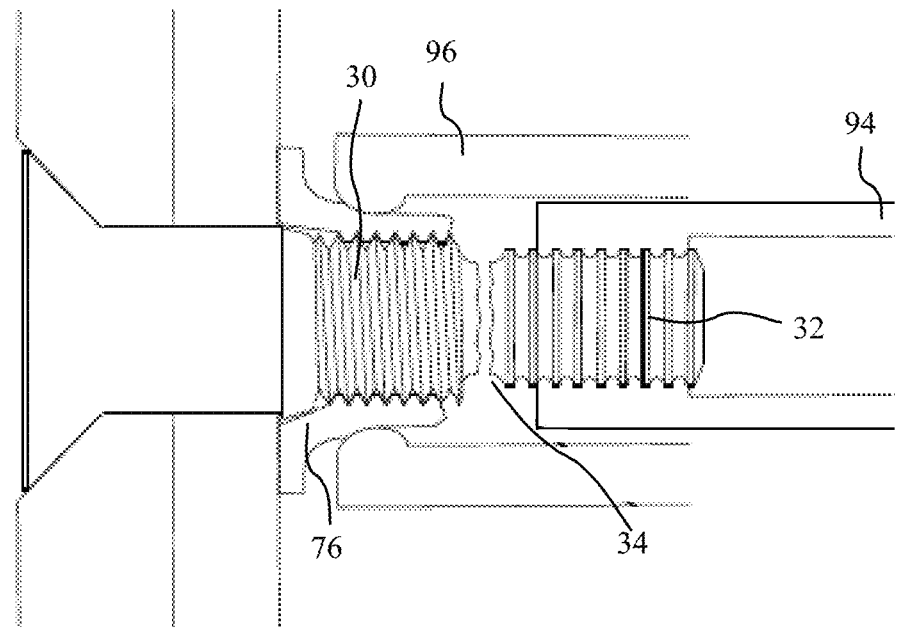
FIG. 19 is a partial section side view of the embodiment of FIG. 14 with the pull stem fractured.
Figure 20:
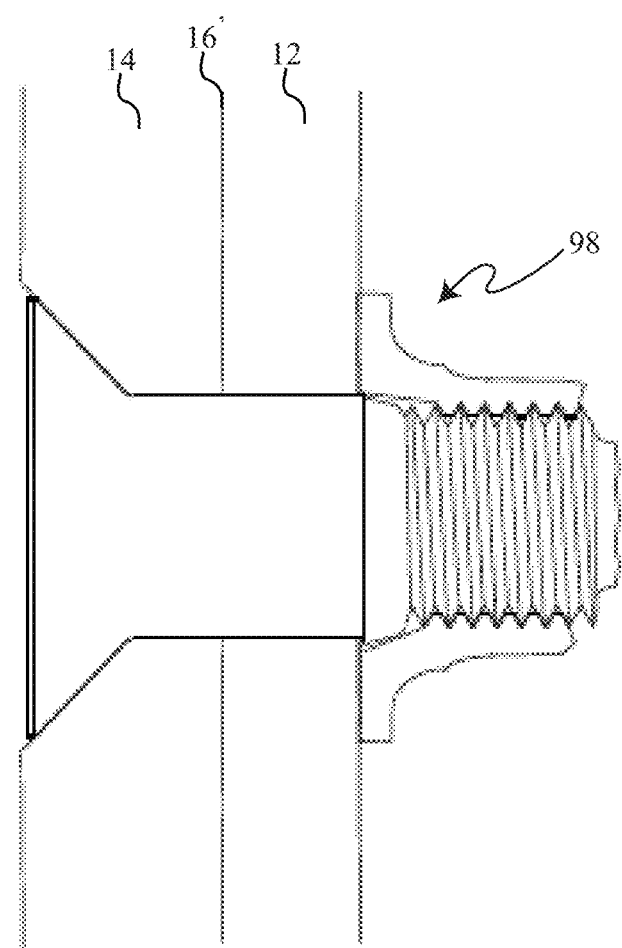
FIG. 20 is a partial section side view of the embodiment of FIG. 14 with the fastener system installation completed.

Drive element 82 is frangible at neck 88, breaking at a torque predetermined to provide a temporary clamp-up tension force on the lock bolt sufficient to induce squeeze out of the fay sealant 16'. Once separated from the collar 76, drive element 82 is removed as shown in FIG. 16. A standard swaging tool 92 having a pull stem gripper 94 then engages the pull stem 32 on the lock bolt 26 and a swage die 96 engages the collar 76 as shown in FIG. 17. A standard swaging extension of swage die 96 deforms collar 76 firmly locking the collar to the locking threads at the desired preload as shown in FIG. 18. Upon reaching the design preload, pull stem 32 fractures at neck 34 as shown in FIG. 19 providing a completed fastener assembly 98 as shown in FIG. 20.

Figure 21:
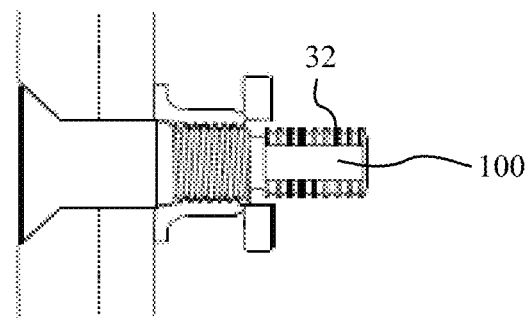
FIG. 21 is a partial section side view of an embodiment with a first anti-rotation feature on the pull stem.
Figure 22:
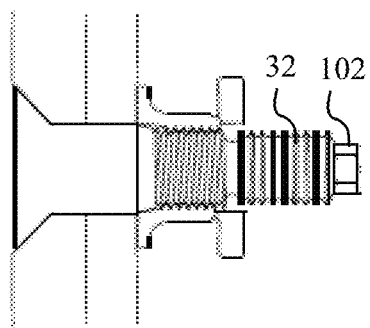
FIG. 22 is a partial section side view of an embodiment with a second anti-rotation feature on the pull stem.
Figure 23:
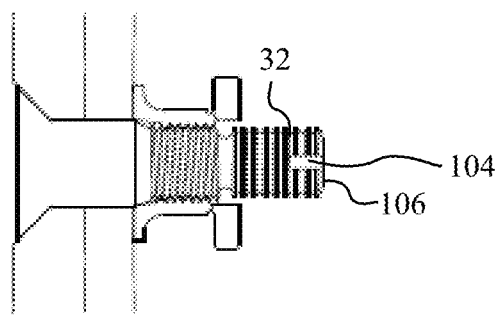
FIG. 23 is a partial section side view of an embodiment with a third anti-rotation feature on the pull stem; and, FIG. 24 is an isometric view of a fifth embodiment employing an integral drive element in a first position on the swage collar.

The swagable frangible drive collar may also be employed in clearance fit applications of lock bolts in joints without use of a sleeve by including an anti-rotation feature on the pull stem of the lock bolt as shown in FIGS. 21-23. A machined flat 100 in the pull stem 32 as shown in FIG. 21, a hex head 102 extending from the pull stem 32 or a blade slot 104 in the face 106 of pull stem 32 may be employed with a stationary mating tool to prevent rotation of the lock bolt during torqueing of the collar 76 until the drive element 82 fractures. The stationary mating tool may then be withdrawn during removal of the fractured drive element and the swaging process performed as previously described with respect to FIGS. 17-20.

Figure 24:
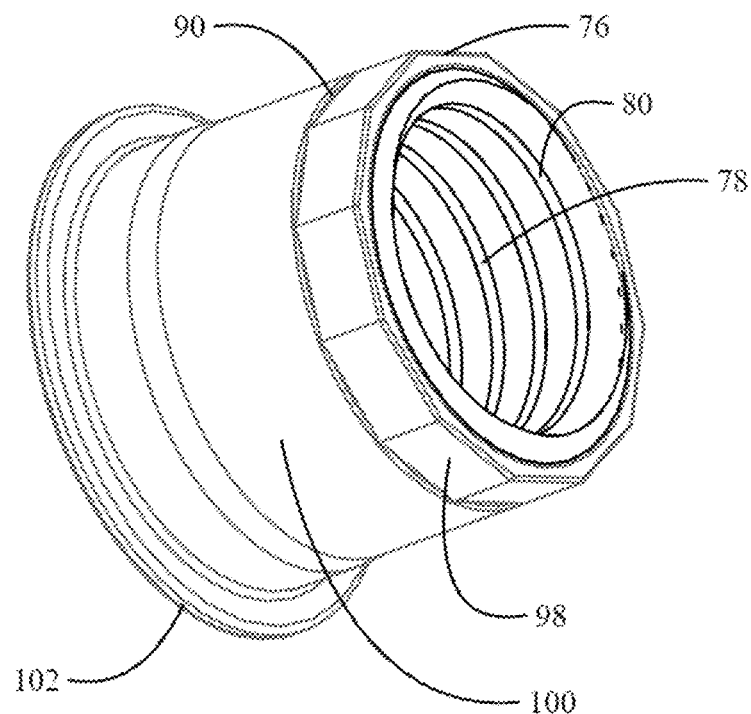
Figure 25:
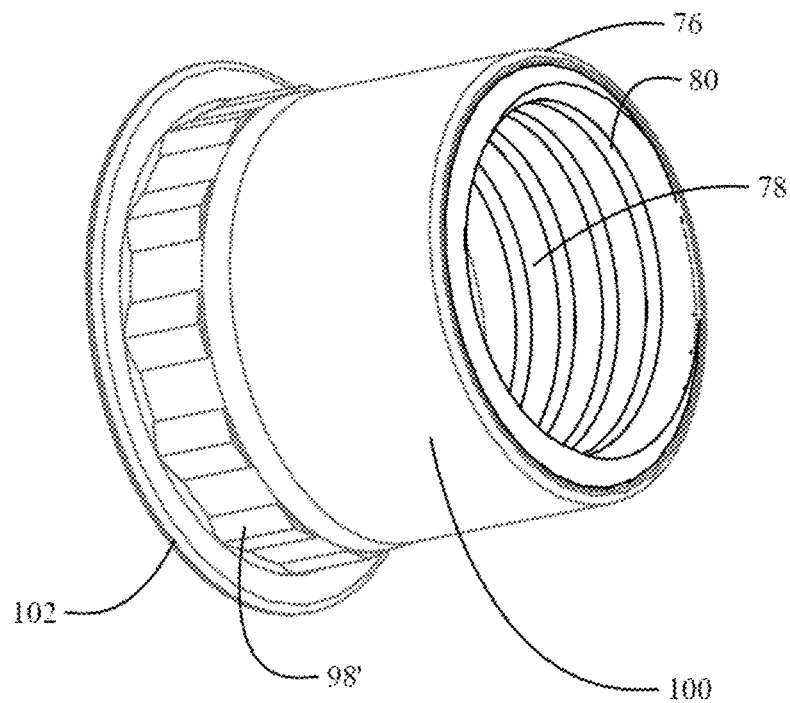
FIG. 25 is an isometric view of the embodiment of FIG. 24 with the drive element in a second position on the swage collar.

As an alternative to the frangible drive element, a fifth embodiment is shown in FIGS. 24 and 25. As shown in FIG. 24, collar 76 incorporates a bore 78 having truncated threads 80 with a predetermined depth to be received over the pull stem 32 of a lock bolt 26 but engage threads on the lock bolt as previously described in FIGS. 14 and 15. However, an integral drive element 98 is machined directly onto the surface 100 of the collar 76. For the configuration shown in FIG. 24, the drive element is located at the tip 90 of the collar 76 and has an outer dimension recessed within the overall circumference of the swaging surface 100 of the collar to allow unimpeded engagement of the surface 100 by the swage die 96 for swaging as described with respect to FIGS. 18 and 19. As shown in FIG. 25, the drive element 98' may alternatively be located adjacent engagement flange 102 of the collar 76 thereby also avoiding interference with engagement of the swage die on surface 100. A twelve point drive is employed for the exemplary embodiments. For both configurations, the collar 76 may be tightened using the drive element 98, 98' to a torque predetermined to provide a clamping force sufficient to induce squeeze out of the fay sealant which may be held for a desired period prior to swaging.

Figure 26A:
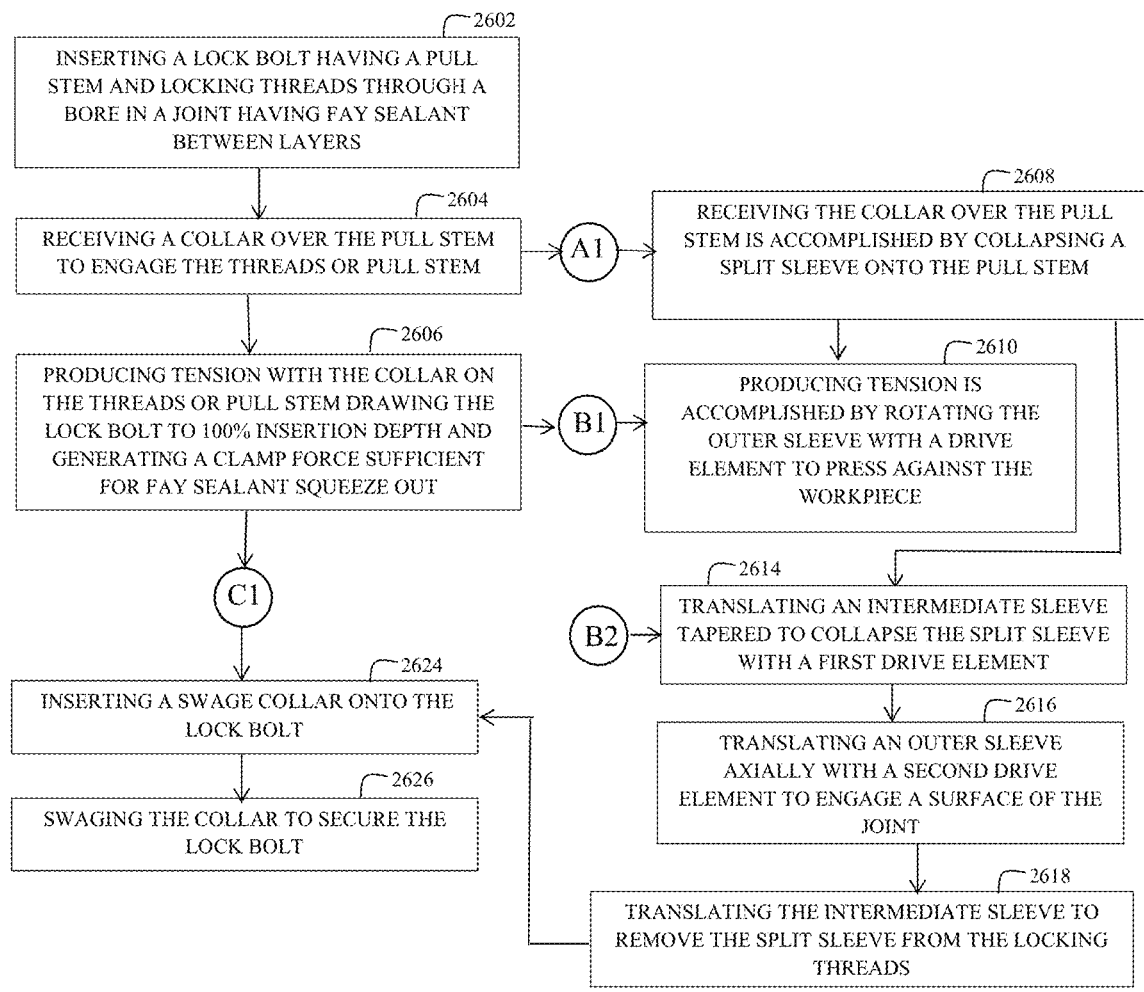
FIGS. 26A and 26B are a flow chart of a method for implementing fay-sealant squeeze-out using the embodiments described herein.
Figure 26B:
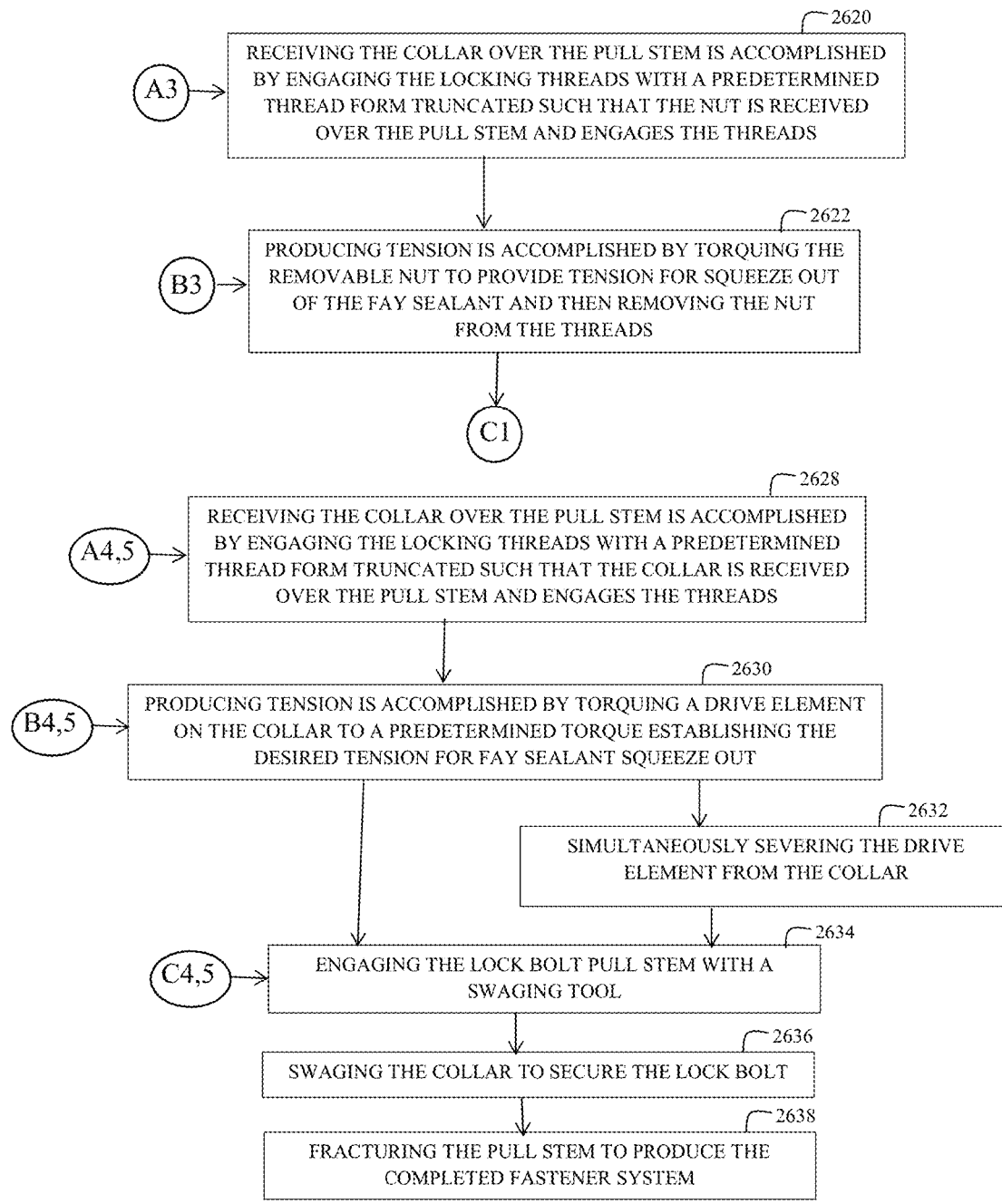

The embodiments disclosed are employed for installation of a fastening system with fay sealant squeeze out as shown in FIGS. 26A and 26B. In the method of installing a fastener system a lock bolt having a pull stem and locking threads is inserted through a bore in a joint having fay sealant between layers, step 2602. In certain embodiments, a sleeve is inserted prior to insertion of the lock bolt to create an interference fit and the lock bolt is driven to 90% to 95% of full depth. A collar is received over the pull stem to engage the threads or pull stem, step 2604. Tension is produced with the collar on the threads or pull stem drawing the lock bolt to 100% insertion depth and generating a clamp force sufficient for fay sealant squeeze out, step 2606. Employing the first embodiment, receiving the collar over the pull stem is accomplished by collapsing a split sleeve onto the pull stem, step 2608 and producing tension is accomplished by rotating the outer sleeve with a drive element to press against the work piece, step 2610. For the second embodiment, receiving a collar over the pull stem is also accomplished by collapsing a split sleeve onto the locking threads but tensioning is accomplished by translating an intermediate sleeve tapered to collapse the split sleeve with a first drive element, step 2614. An outer sleeve is then axially translated with a second drive element to engage a surface of the joint, step 2616. The intermediate sleeve is then translated to remove the split sleeve from the locking threads, step 2618.

For the third embodiment wherein the collar is a removable nut, the locking threads are engaged with a predetermined thread form truncated such that the nut is received over the pull stem and engages the threads, step 2620. The removable nut is then torqued to provide tension for squeeze out of the fay sealant and then removed from the threads, step 2622. For each of the first through third embodiments, a swage collar is then inserted onto the lock bolt, step 2624 and the swage collar is swaged to secure the lock bolt, step 2626.

For the fourth and fifth embodiments, the threads are engaged by a collar with a predetermined thread form truncated such that the collar is received over the pull stem and engages the locking threads, step 2628. A drive element on the collar is torqued to a predetermined torque establishing the desired tension for fay sealant squeeze out, step 2630, simultaneously severing the drive element from the collar in the fourth embodiment, step 2632. A swaging tool engages the lock bolt pull stem (the severed drive element being removed from the lock bolt, if required), step 2634 and swages the collar to secure the lock bolt, step 2636, fracturing the pull stem step 2638 to produce the completed fastener system.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A joint fastening system comprising:
   a lock bolt having a pull stem and locking threads inserted through a bore in a joint having fay sealant between layers;
   a collar receivable over the pull stem without contact to engage the threads, said collar producing tension on said threads to generate clamp force sufficient for fay sealant squeeze out; and,
   a sleeve insertable into said bore, said sleeve receiving said lock bolt with an expanding interference fit induced by rotational engagement of the collar on the threads drawing the lock bolt to 100% insertion depth.

2. The joint fastening system as defined in claim 1 wherein the collar comprises a removable nut internally threaded having a root of a predetermined thread form truncated such that the nut is received over the pull stem without contact and engages the locking threads.

3. The joint fastening system as defined in claim 2 further comprising a swage collar internally threaded having a root of a predetermined thread form truncated such that the swage collar is received over the pull stem and replaceably engaged on the locking threads.

4. A joint fastening system comprising:
   a lock bolt having a pull stem and locking threads inserted through a bore in a joint having fay sealant between layers;
   a collet clamp receivable over the pull stem without contact to engage the threads which is collapsible to engage the locking threads; and,
   a retention ring received over a split sleeve to collapse the collet clamp, said collet clamp producing tension on said threads to generate clamp force sufficient for fay sealant squeeze out.

5. The joint fastening system as defined in claim 4 wherein the collet clamp further incorporates a drive element for rotating the split sleeve on the threads.

6. A joint fastening system comprising:
   a lock bolt having a pull stem and locking threads inserted through a bore in a joint having fay sealant between layers;
   an inner split sleeve receivable over the pull stem without contact to engage the threads and collapsible to engage the pull stem;
   an intermediate sleeve tapered to collapse said inner sleeve upon translation;
   a first drive element for translating the intermediate sleeve;
   an outer sleeve engaging a surface of the joint upon axial translation; and,
   a second drive element for translating the outer sleeve, said inner split sleeve producing tension on said threads to generate clamp force sufficient for fay sealant squeeze out.

7. The joint fastening system as defined in claim 6 wherein the first drive element is threaded to induce translation of the intermediate sleeve upon rotation.

8. The joint fastening system as defined in claim 6 wherein the second drive element is threaded to induce translation of the outer sleeve upon rotation.

9. A joint fastening system comprising:
   a lock bolt having a pull stem and locking threads inserted through a bore in a joint having fay sealant between layers; and
   a swage collar having a hex drive head frangible at a neck to receive a lock bolt collar swage die for swaging, said swage collar incorporating truncated threads received over the pull stem and engaging the locking threads, said swage collar producing tension on said threads to generate clamp force sufficient for fay sealant squeeze out.

10. The joint fastening system as defined in claim 9 wherein the drive element comprises a twelve point drive integral to a surface of the collar at a tip and recessed therefrom.

11. The joint fastening system as defined in claim 9 wherein the drive element comprises a twelve point drive integral to a surface of the collar adjacent an engagement flange of the collar.

12. A fastener comprising:
    a lock bolt having a pull stem and locking threads inserted through a bore in a joint; and,
    a collar having threads truncated radially at a root of the thread with a predetermined depth for a minor diameter to be received over the pull stem but engage the threads and having a drive element frangible at a predetermined torque configured to provide a temporary clamp-up tension force.

13. The fastener as defined in claim 12 wherein the collar threaded onto the lock bolt produces sufficient clamp-up tension to provide squeeze out of sealant between layers of a laminate.

14. The fastener as defined in claim 12 wherein the collar is swagable upon fracture of the drive element.

15. The fastener as defined in claim 12 wherein the pull stem of the lock bolt includes an anti-rotation feature.

16. The fastener as defined in claim 15 wherein the anti-rotation feature is selected from the group consisting of a machined flat, a hex head and a slot.

17. A method of installing a fastener system comprising:
    inserting a lock bolt having a pull stem and locking threads through a bore in a joint having fay sealant between layers;
    receiving a collar over the pull stem to engage the locking threads, said collar having threads truncated radially at a root of the thread with a predetermined depth for a minor diameter to be received over the pull stem but engage the threads and having a drive element frangible at a predetermined torque configured to provide a temporary clamp-up tension force,
    producing tension with the collar on said locking threads to generate clamp force sufficient for fay sealant squeeze out.

18. The method of claim 17 wherein the step of receiving a collar over the pull stem comprises:
    collapsing a split sleeve onto the locking threads;
    and said step of producing tension comprises:
    rotating the split sleeve with a drive element.

19. The method of claim 18 further comprising:
    removing the split sleeve from the locking threads;
    inserting a swage collar onto the lock bolt; and,
    swaging the swage collar to secure the lock bolt.

20. The method of claim 17 wherein the step of receiving a collar over the pull stem comprises:
    collapsing a split sleeve onto the locking threads;
    and said step of producing tension comprises:
    translating an intermediate sleeve tapered to collapse said split sleeve with a first drive element; and
    axially translating an outer sleeve with a second drive element to engage a surface of a laminate.

21. The method of claim 20 further comprising:
    translating the intermediate sleeve to remove the split sleeve from the locking threads;

inserting a swage collar onto the lock bolt; and,
swaging the swage collar to secure the lock bolt.

22. The method of claim 17 wherein the collar is a removable nut and the step of receiving a collar over the pull stem comprises:
engaging the locking threads with a predetermined thread form truncated such that the nut is received over the pull stem and engages the locking threads.

23. The method of claim 22 further comprising
removing the collar from the locking threads;
inserting a swage collar onto the lock bolt; and,
swaging the swage collar to secure the lock bolt.

24. The method of claim 17 wherein the step of receiving a collar over the pull stem comprises:
engaging the locking threads with a predetermined thread form truncated such that the collar is received over the pull stem and engages the locking threads; and,
torqueing a frangible drive element on the collar to a predetermined torque severing the drive element from the collar.

25. The method of claim 17 further comprising swaging the collar to secure the lock bolt.

\* \* \* \* \*